(12) United States Patent
Kreiner et al.

(10) Patent No.: US 10,075,906 B2
(45) Date of Patent: Sep. 11, 2018

(54) FACILITATING DYNAMIC PRIVATE COMMUNICATION NETWORKS

(71) Applicant: AT&T Intellectual Property I, L.P., Atlanta, GA (US)

(72) Inventors: Barrett M. Kreiner, Woodstock, GA (US); Jonathan L. Reeves, Roswell, GA (US); Ryan L. Schaub, Norcross, GA (US); Donna S. Couch, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 210 days.

(21) Appl. No.: 14/547,969

(22) Filed: Nov. 19, 2014

(65) Prior Publication Data
US 2016/0142911 A1    May 19, 2016

(51) Int. Cl.
*H04W 48/18*   (2009.01)
*H04L 29/06*   (2006.01)
(Continued)

(52) U.S. Cl.
CPC ......... *H04W 48/18* (2013.01); *H04L 63/0272* (2013.01); *H04L 63/062* (2013.01); *H04W 12/00* (2013.01); *H04W 12/04* (2013.01)

(58) Field of Classification Search
CPC ......... H04L 12/2838; H04L 2012/2843; H04L 2012/2845; H04L 12/28; H04L 12/2803;
(Continued)

(56) References Cited

U.S. PATENT DOCUMENTS 7,580,701 B2    8/2009 Ross et al.
7,647,048 B2    1/2010 Brok et al.
(Continued)

FOREIGN PATENT DOCUMENTS

EP    1876761 B1    8/2010
GB    2473825 A     3/2011
WO    2013183931 A1 12/2013

OTHER PUBLICATIONS

Cunche, et al., "Linking Wireless Devices Using Information Contained in Wi-Fi Probe Requests," Pervasive and Mobile Computing, 2013, 27 pages, Version 1, Retrieved on Sep. 6, 2014.
(Continued)

*Primary Examiner* — Natasha W Cosme
(74) *Attorney, Agent, or Firm* — Amin, Turocy & Watson, LLP

(57) ABSTRACT

Private communication networks are facilitated. One method includes broadcasting, by a first device, to an access point device associated with a first network, a first signal comprising an identifier for a second network, wherein the access point device of the first network foregoes broadcast of a name of the first network, and wherein the first device is located at a first location and a second device is located at a second location remote from the first location. The first device and the second device are associated with the second network. The method also includes receiving a second signal indicative of a broadcast of the name of the second network based on an authentication of the identifier for the second network and key data representing a key for the second network; and connecting to a network device of the second network in response to the receiving the second signal.

20 Claims, 13 Drawing Sheets

(51) Int. Cl.
*H04W 12/00* (2009.01)
*H04W 12/04* (2009.01)

(58) Field of Classification Search
CPC . H04L 12/2832; H04L 12/6418; H04L 12/66; H04L 2012/2841; H04L 12/2805; H04L 12/5692; H04L 41/5038; H04L 41/5087; H04L 41/5096; H04L 12/282; H04W 84/12; H04W 92/02; H04W 80/00; H04W 16/20; H04W 4/04; H04W 4/18; H04W 84/14; H04W 48/16; H04W 48/18; H04W 84/18; H04W 88/06; H04W 88/16; H04W 16/14; H04W 28/12; H04W 28/26; H04W 74/085
USPC .................................................. 370/328, 338
See application file for complete search history.

(56) References Cited

U.S. PATENT DOCUMENTS

| | | | |
|---|---|---|---|
| 7,924,793 | B2 | 4/2011 | Savoor et al. |
| 8,077,689 | B1* | 12/2011 | Jones ................. H04L 63/0272 370/338 |
| 8,131,303 | B2 | 3/2012 | Cook et al. |
| 8,165,101 | B2 | 4/2012 | Abhishek et al. |
| 8,553,662 | B2 | 10/2013 | Chen et al. |
| 8,619,729 | B2 | 12/2013 | Alper et al. |
| 8,750,265 | B2 | 6/2014 | Scherzer et al. |
| 8,782,172 | B2 | 7/2014 | Kim et al. |
| 8,799,476 | B2 | 8/2014 | Karaoguz et al. |
| 9,100,381 | B2 | 8/2015 | Cai et al. |
| 9,125,170 | B2 | 9/2015 | Varsavsky Waisman-Diamond |
| 2002/0059434 | A1* | 5/2002 | Karaoguz ........... H04L 12/5692 709/228 |
| 2004/0073784 | A1 | 4/2004 | Ishidoshiro |
| 2007/0082654 | A1* | 4/2007 | Hovnanian ........... H04W 12/08 455/410 |
| 2009/0129301 | A1 | 5/2009 | Belimpasakis |
| 2009/0161683 | A1 | 6/2009 | Allie et al. |
| 2009/0299836 | A1* | 12/2009 | Sachs ................. G06Q 30/0241 705/14.4 |
| 2010/0309815 | A1* | 12/2010 | Yepez ................. H04L 12/4625 370/254 |
| 2011/0296501 | A1 | 12/2011 | Drovdahl et al. |
| 2013/0208693 | A1 | 8/2013 | De La Forest Divonne et al. |
| 2013/0263217 | A1 | 10/2013 | Avital |
| 2013/0308565 | A1 | 11/2013 | Riegel |
| 2013/0308622 | A1 | 11/2013 | Uhlik |
| 2013/0340013 | A1 | 12/2013 | Chadha |
| 2014/0029750 | A1* | 1/2014 | Wei ..................... H04L 63/0272 380/270 |
| 2014/0064257 | A1 | 3/2014 | Fontaine et al. |
| 2014/0185599 | A1 | 7/2014 | Vatanapanpilas et al. |
| 2015/0172957 | A1 | 6/2015 | Sarawat et al. |
| 2015/0195760 | A1 | 7/2015 | Sanz et al. |

OTHER PUBLICATIONS

"Wi-Fi Certified Passpoint Architecture for Public Access." Aruba White Paper, 2011,15 pages, Aruba Networks, Retrieved on Sep. 6, 2014.

Office Action for U.S. Appl. No. 15/169,692 dated Nov. 16, 2017, 38 pages.

Office Action for U.S. Appl. No. 15/169,692 dated Jun. 7, 2018, 35 pages.

* cited by examiner

| NETWORK NAME/ IDENTIFIER | PASSWORD | ROUTING INFORMATION | PROVISIONED BANDWIDTH | PROVISIONED SPEED | PROVISIONED DEVICES |
| --- | --- | --- | --- | --- | --- |
| NETWORK 122 IDENTIFIER | 2RJIFEJEFEFIEJEO FEJHFJEOJEIFEJF OI | ROUTE 1 TO PRIVATE NETWORK 122 | 8 MEGABYTES/ SECOND | FIRST-TIER SPEED | 106, 108, 110, 112 |
| NETWORK 123 IDENTIFIER | 17JHFEMEFEFIEJE OFEJHFJEOJEIFEJ F5 | ROUTE 2 TO PRIVATE NETWORK 123 | 4 MEGABYTES/ SECOND | SECOND-TIER SPEED | 125, 126, 127 |

800

FIG. 8

FACILITATING DYNAMIC PRIVATE COMMUNICATION NETWORKS

TECHNICAL FIELD

The subject disclosure relates generally to communication networks and to facilitating dynamic private communication networks.

BACKGROUND

In modern day society, user connectivity to selected networks is highly-desirable. The drive to remain connected is fostered by the reduction in complexity resultant from interacting with familiar computing and device environments. However, current solutions to obtain access to various networks are complicated.

BRIEF DESCRIPTION OF THE DRAWINGS

FIG. 8 illustrates an example provisioning table of the provisioning server device of FIG. 7 in accordance with one or more embodiments described herein.

DETAILED DESCRIPTION

Figure 1:
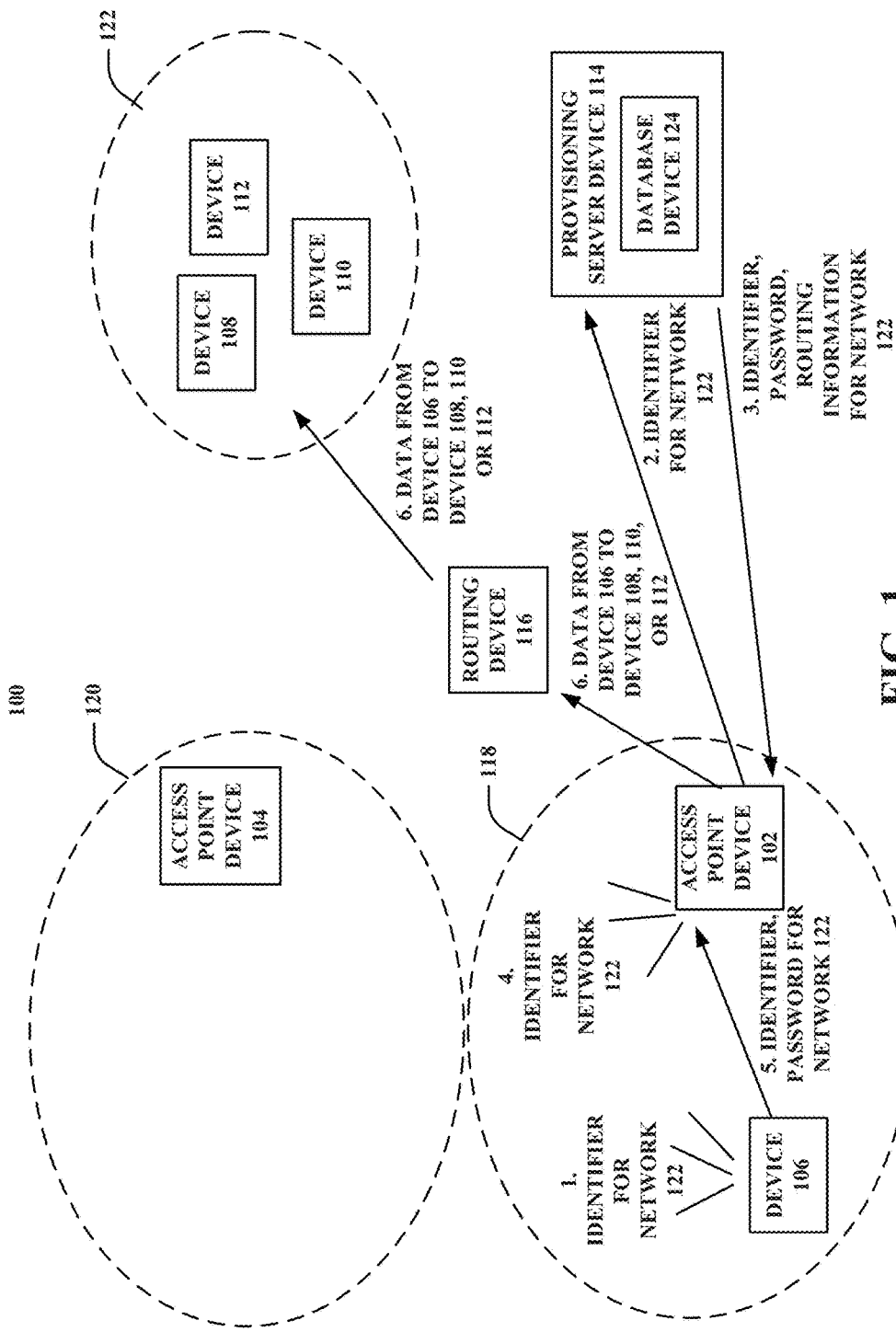
FIG. 1 illustrates an example block diagram of a system in which private communication networks can be facilitated in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Users of Wi-Fi/hot spot services typically desire an ability to expand ease of use of such service across a number of different areas, including the use of public Wi-Fi networks. However, users also desire security and convenience while accessing these networks. Current solutions make it very complicated to obtain secure Wi-Fi access. One or more embodiments described herein reverse the traditional wireless network and/or wireless client model by centralizing the provisioning of wireless networks, for the end user, and then allowing remote devices/nodes to establish wireless networks, hidden and advertised, from a provisioning server device.

Embodiments described herein include systems, methods, apparatus and/or computer-readable storage media facilitating secure access to private communication networks via public communication networks. In one embodiment, a method includes broadcasting, by a first device comprising a processor, to an access point device associated with a first network, a first signal comprising an identifier for a second network, wherein the access point device of the first network foregoes broadcast of a name of the first network, wherein the first device is located at a first location and a second device is located at a second location remote from the first location, and wherein the first device and the second device are associated with the second network. The method also includes receiving, by the first device, a second signal indicative of a broadcast of the name of the second network based on an authentication of the identifier for the second network and key data representing a key for the second network. The method also includes connecting, by the first device, to a network device of the second network in response to the receiving the second signal.

Another embodiment includes an apparatus including processor; and a memory that stores executable instructions that, when executed by the processor, facilitate performance of operations. The operations include transmitting, to an access point device associated with a first network, a first signal including an identifier and key information representing a key for a second network, wherein the access point device of the first network foregoes broadcast of a name of the first network, wherein a first device is located at a first location and a second device is located at a second location remote from the first location, and wherein the first device and the second device are associated with the second network.

In another embodiment, a computer-readable storage device stores computer-executable instructions that, in response to execution, cause a first device comprising a processor to perform operations. The operations include receiving, from a second device, a first broadcast signal identifying a first network associated with the second device, wherein the first device is associated with a second network; and determining that the first network is approved based on correspondence between an identifier of the first network and information about approved networks. The operations also include broadcasting a second signal identifying the first network in response to determining that the first network is approved, wherein the broadcasting the second signal is performed after the receiving the broadcast of the first broadcast signal.

Embodiments described herein can advantageously provide a system that enables easy roaming by devices and secure access to a private home network associated with the device. A user device can obtain secure and convenient access to a virtual private network automatically in various locations to which a user may travel outside of the home without resort to cumbersome virtual private network (VPN) software or secure socket layer (SSL) software. Thus, the device is able to communicate with devices associated with the private network while the device is located remote from the devices on the private network.

Turning now to the drawings, FIG. 1 illustrates an example block diagram of a system in which private communication networks can be facilitated in accordance with one or more embodiments. System 100 can enable a device to advantageously maintain secure communication with or securely connect to a private communication network while being remote from the location associated with the private communication network.

In the embodiment shown, system 100 includes access point devices 102, 104, devices 106, 108, 110, 112, provisioning server device 114 and/or routing device 116. Also shown are networks 118, 120 and 122. In various embodiments, one or more of access point devices 102, 104, devices 106, 108, 110, 112, provisioning server device 114 and/or routing device 116 can be electrically and/or communicatively coupled to one another to perform one or more functions of system 100. As used herein, the terms "private communication network" and "private network" mean or include a network that is associated with a defined user (or a defined set of users) and provisioned for use by a selected set of devices associated with the defined user (or the defined set of users). In FIG. 1, network 122 is a private network provisioned for devices 106, 108, 110, 112.

Devices 106, 108, 110, 112 can include a device having hardware, software or a combination of hardware and software and configured to communicate over a wired or wireless network. By way of example, but not limitation, devices 106, 108, 110, 112 can be or include smart phones, laptops, personal computers, tablet computers, digital video recorders, set top boxes, home cameras, home security systems, sensors or the like. Devices 106, 108, 110, 112 can be communicatively coupled to network 122 via a wired (e.g., Ethernet) or a wireless connection in various embodiments.

In one embodiment, devices 106, 108, 110, 112 are associated with network 122. Network 122 can be a private network limited to devices 106, 108, 110, 112 in some embodiments. By way of example, but not limitation, network 122 can be a home residential network for devices 106, 108, 110, 112. In other embodiments, network 122 can be at different locales. For example, network 122 can be a private network established at a hotel locale or other location as provisioned through provisioning server device 114 for the benefit of devices 106, 108, 110, 112.

Access point devices 102, 104 can include hardware, software or a combination of hardware and software, and can be configured to conduct communication with one or more of devices 106, 108, 110, 112 (or any other device in the area covered by access point devices 102, 104), with provisioning server device 114, with routing device 116 and/or any number of other devices to facilitate a location connection point to a larger network. By way of example, but not limitation, access point devices 102, 104 can be configured to provide Wi-Fi/hot spot service within the area of communication covered by access point devices 102, 104.

In some embodiments, one or more of access point devices 102, 104 can be electrically and/or communicatively coupled to provisioning server device 114 and/or routing device 116 to provide access to device 106 to the private network for devices 106, 108, 110, 112 (e.g., network 122) while device 106 is outside of the coverage area of network 122. As used herein, provisioning server device 114 is a central provisioning server inside of a core network for system 100.

One or more of devices 106, 108, 110, 112 can be stationary and/or mobile devices. In one embodiment, device 106 is a mobile device that can roam from network 122 to the geographical area of coverage associated with access point device 102 and corresponding network 118 to the geographical area of coverage associated with access point device 104 and corresponding network 120.

In the embodiments described herein, networks 118, 120 are hidden networks for which a signal indicating the presence of networks 118, 120 is not broadcast or transmitted by access point devices 102, 104 unless a defined series of events has been initiated and performed by device 106 to request connection to private network 122 via one or more of access point devices 102, 104. For example, access point devices 102, 104 do not broadcast or transmit a signal indicative of the name of the network 118 or network 120 prior to initiation of contact and/or provisioning of defined information with access point devices 102, 104 by device 106.

The process will now be described in greater detail. Device 106 can roam to or otherwise be located within the coverage area of access point device 102. While within the defined coverage area such that access point device 102 can detect a broadcast signal from device 106, device 106 can broadcast a unique identifier (e.g., service set identifier (SSID)) for a private network with which device 106 is associated, and to which device 106 would like to be connected via access point device 106. For example, notwithstanding access point device 102 does not broadcast or transmit the name of network 118, and therefore device 106 does not detect the name of network 118 and/or that access point device 102 is present, device 106 initiates broadcast or transmission of the name of private network 122. By way of example, but not limitation, the broadcast can be in accordance with 802.11 standards. In some embodiments, the signal broadcast/transmitted by device 106 includes, but is not limited to, information indicative of an identifier of network 122.

Figure 2:
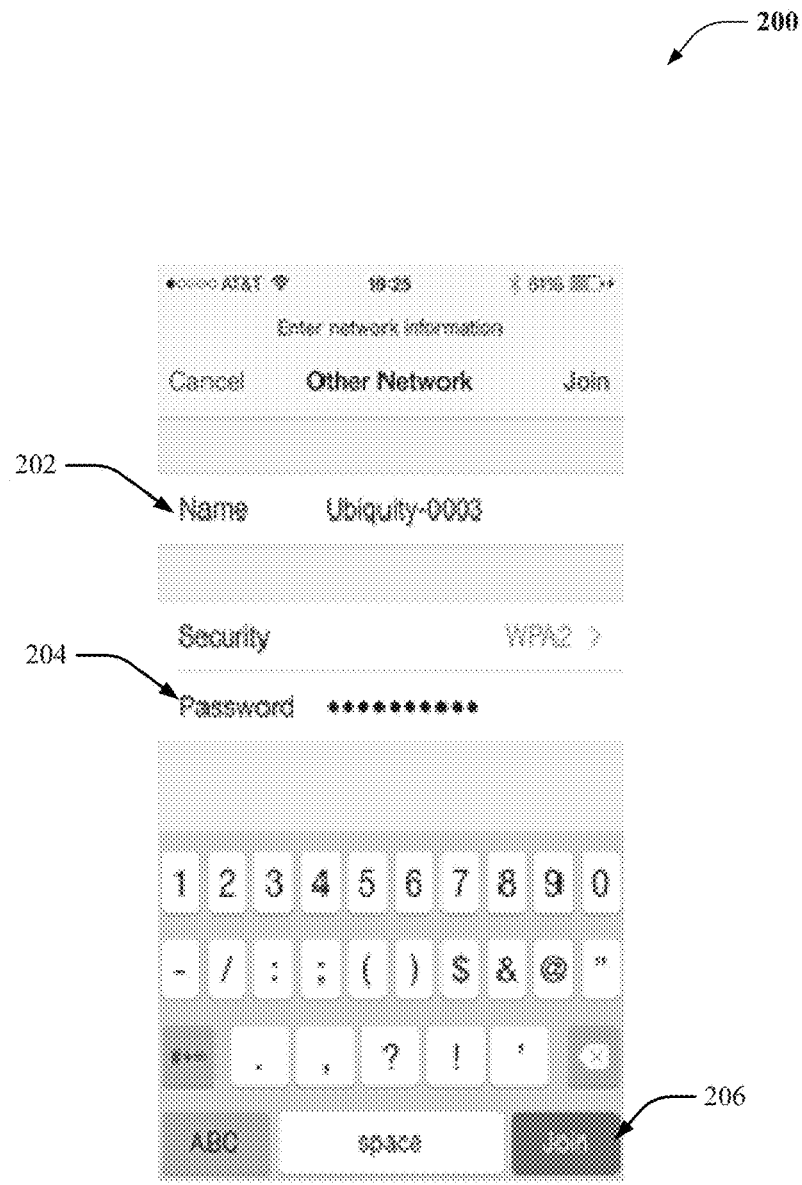
FIG. 2 illustrates an example block diagram of a graphical user interface of a device of FIG. 1 for which a private communication network can be facilitated in accordance with one or more embodiments described herein.

The identifier transmitted by device 106 can be pre-programmed in device via hardware and/or software associated with or stored in device 106 at installation or purchase of device 106 in some embodiments, for example. FIG. 2 illustrates an example block diagram of a graphical user interface of a device of FIG. 1 for which a private communication network can be facilitated in accordance with one or more embodiments described herein. Repetitive description of like elements employed in other embodiments described herein is omitted for sake of brevity.

Graphical user interface is one example of a screen of device 106 that can be receive an identifier for a private network, password for the private network to manually provision the request by device 106 of the private network. In other embodiments, this information can be pre-stored in device 106 and the information need not be manually entered or is already stored in device 106 upon the arrival of device 106 at the region covered by access point device 102.

As shown in FIG. 2, in some embodiments, device 106 can include a graphical user interface 200 that can display a first section for receiving or indicating a network name associated with device 106. In this case, the network name 202 is "Ubiquity-0003." As described, network name 202 can be or include the identifier (e.g., SSID) broadcast/transmitted by device 106. In some embodiments, network name 202 is associated with the identifier broadcast/transmitted by device 106.

As described, network name 202 can be a previously-assigned private network to which device 106 is associated. For example, in one embodiment, provisioning server device 114 can store a set of network names and corresponding passwords associated with various networks (as described and shown later with reference to FIG. 8). In some embodiments, each user is assigned a unique network name (e.g., identifier) and password/key.

Graphical user interface 200 can also display a second section for receiving or indicating receipt of password/key 204 associated with network name 202. Password/key 204 can be information unique to a particular network that allows a device (e.g., device 106) to connect to the network identified by network name 202. Graphical user interface 200 can also include a third section displaying a button that can be activated to transmit/broadcast the network name and password from device 106 to access point device 102. In various embodiments, device 106 can broadcast/transmit network name 202 and password 204 at periodic intervals (e.g., every two minutes, every five minutes) or upon the detection of an event (e.g., roaming within a defined distance of a mapped retail establishment).

In some embodiments, once device 106 is activated to join a specified network, device 106 can broadcast a request to be connected to network 122 to access point device 102.

Turning back to FIG. 2, one or more (or every) Wi-Fi access point device in the range of device 106 will hear the request for the network parley from device 106. In the embodiment shown, access point device 102 can receive/detect the signal from device 106 since device 106 transmits/broadcasts the signal while within the coverage area of network 118. Access point device 102 can establish a secure connection back to provisioning server device 114 to determine whether the broadcast/transmitted identifier is an authorized network. In some embodiments, the identity of and/or identifier for a network is therefore maintained as secure. As used herein, an authorized network can be a network provisioned by provisioning server device 114 or otherwise part of a larger core network associated with provisioning server device 114.

Provisioning server device 114 can include hardware, software or a combination of hardware and software configured to provision a new private network to one or more devices (e.g., devices 106, 108, 110, 112) and/or establish provisioning of a roaming device to the private network associated with the roaming device. In some embodiments, provisioning server device 114 can store the assigned network name and password for the network upon assignment of such information to a user and/or to a device, for example.

In various embodiments, provisioning server device 114 can provision one or more of devices 106, 108, 110, 112 with the following information: the unique private network name/identifier (e.g., SSID), private network key (e.g., password), the address space of the private network, the routing table of the private network, the target internal virtual router, along with appropriate key and credentials for the private network to connect to the private network securely and/or any additional configuration of the network.

Virtual local area networks (VLANs) are typically common in the network. For example, a particular router can handle many virtual segments across a common architecture. In home networks, for example, routing can be handled by a residential gateway, or intermediate customer premise devices, such that packets with local source and destination addresses within the physical network can be handled internally, and external network requests can be passed to a gateway or modem (e.g., digital subscriber line (DSL) modem) out to the larger Internet. In this case, with multiple devices on VLAN segments being supplied by access point devices that are isolating the traffic of all the client devices from each other, a virtual router can be the destination device in the network where the virtual segments join logically and appear to be the equivalent of the home residential gateway or router, with a logical gateway device for packets with source and destination addresses outside the VLAN. With reference to the foregoing example, the network can be considered to be a large pseudo-virtual private network. An ingress point and/or an egress point of the network can have a VLAN assignment that allows for transition from internal to external routing. There can be traffic over a residential gateway that is internal to the residence, traffic that is specific to a particular network and traffic entering and exiting the local network. One or more (or, in some embodiments, each) of these traffic lanes can have a defined VLAN for traffic management. Therefore, in some embodiments, both destination and identification information can identify the VLAN to which the traffic is targeted.

In some embodiments, routing and/or addressing can be managed by any number of applications. One example application is the VMware NSX network virtualization and security platform. As described above, these applications can be dependent on network micro-segmentation, virtualized instance (e.g., cloud) and/or multi-path routing.

Provisioning of a private network to a user and/or a device can be performed at time of installation or purchase of the one or more devices in some embodiments. For example, if device 108 is a digital video recorder, provisioning of network 122 for device 108 (and updating the information at database device 124) can be performed at the time of installation of device 108 in a home location, for example. Similarly, if device 106 is a smart phone, at the time of purchase of the smart phone, or at the time that the smart phone is activated, provisioning of network 122 for device 106 (and updating the information at database device 124) can be performed.

Provisioning server device 114 can include or access, directly or over a network, database device 124. Database device 124 can store identifiers for different networks and can be queried by access point device 102 to determine if the identifier transmitted/broadcast by device 106 is a valid identifier. Database device 124 can also store information regarding how to route the information that is transmitted from device 106.

Since provisioning can be performed at the time of installation, pairing of devices to a residential gateway device is not required. No residential gateway device is required at the area covered by network 122. Devices 108, 110, 112 can connect directly to the private wireless network. While no residential gateway device is required, a residential repeater could be included within a distance of devices 108, 110, 112 at the area covered by network 122 in some embodiments (e.g., if devices 108, 110, 112 are located a particular distance from access point device 102 or routing device 116, which transmits the signal to the area covered by network 122). In some embodiments, an optical network terminal (ONT) employed with fiber-to-the premises applications can be employed at the location covered by network 122 (e.g., home).

In some embodiments, an option can be provided for installation without labor being required at the location of devices 108, 110, 112. For example, the core network associated with provisioning server device 114 or provisioning server device 114 can transmit a wireless broadcast to the area to be covered by network 122. No modifications to the home are required. Access to the area covered by network 122 (e.g., a home) is only needed if the customer desires specific installation help, otherwise installation can be performed on a user-directed self-service basis with the installation being done wirelessly.

In some embodiments, provisioning server device 114 can provision different amounts of speed for a particular network. The speed provisioned can also be part of the quality of service provided/guaranteed. In some embodiments, the speed can be provisioned to be variable up to several Gigabytes per second (Gbytes/s) based on a variety of factors (e.g., types of devices on the network and corresponding sensitivity to data transmission delay, need for real-time service, price at which network was purchased or the like).

In some embodiments, the provisioning server device 114 (or any other device in system) can provision an amount of bandwidth for the private network and/or based on the one or more devices associated with the private network. The amount of bandwidth can be a fixed amount of bandwidth in some embodiments. The amount of bandwidth can be a guaranteed amount of bandwidth to provide a defined quality of service in some embodiments. In other embodiments, the guaranteed amount of bandwidth can be a maximum amount of bandwidth.

In either case, whether the amount of bandwidth is a guaranteed minimum amount of bandwidth or a maximum amount of bandwidth, the amount of bandwidth provisioned can be based on the functionality of the particular device of devices 106, 108, 110, 112, for example, in some embodiments. For example, a device that is a set top box device can be provisioned a first amount of bandwidth while a device that is a digital video recorder can be provisioned a second amount of bandwidth that is greater than the amount of bandwidth provisioned for the set top box since the digital video recorder is likely to require more bandwidth due to the purpose of the digital video recorder.

In one embodiment, 8 Mbytes/s can be provisioned for a digital video recorder while 6 Mbytes/s can be provisioned for a set top box. The amount of bandwidth that can be provisioned can be provisioned equally for incoming traffic and for outgoing traffic in some embodiments. For example, a digital video recorder that is provisioned 8 Mbytes/s can have 4 Mbytes/s of bandwidth provisioned for incoming traffic and 4 Mbytes/s provisioned for outgoing traffic.

In some embodiments, the incoming and outgoing bandwidth can be provisioned in an asymmetric manner. For example, the device can be provisioned to have more bandwidth on the incoming link for devices that have an extensive amount of data transmitted to the device (and much less data transmitted from the device).

In some embodiments, in lieu of provisioning bandwidth based on the one or more devices of a network, provisioning server device 114 can establish a class of service for the private network, and one or more (or, in some embodiments, all of the) devices associated with network 122 can enjoy the service as needed. For example, a maximum bandwidth (e.g., maximum amount of instantaneous bandwidth) can be provisioned for all devices associated with network 122. Each of devices 106, 108, 110, 112 can utilize any portion of the maximum bandwidth in some embodiments. As such, the amount of bandwidth utilized by a particular one of devices 106, 108, 110, 112 at any specific time can depend on the need of the particular device at the specific time.

This provisioning allows the network to identify hotspots in usage in which there is not enough bandwidth to meet the needs of the devices associated with the private network and thereby provide capacity management. In some embodiments, provisioning server device 114 can dynamically adjust the maximum amount of bandwidth associated with a network based on detection of whether there may not be enough bandwidth to meet the needs of the devices. As such, in some embodiments, provisioning server device 114 can provision bandwidth for a private network and allow the devices associated with the private network to utilize any amount of the bandwidth for the network as needed.

Provisioning server device 114 can review the contents of database device 124 (or provisioning table 800 of FIG. 8, which can be within or communicatively coupled to database device 124) to determine whether the identifier broadcast/transmitted by device 106 is an authorized private network. If the provisioning server device 114 determines that the identifier identified by access point device 102 as having been received by device 106 is an authorized network, provisioning server device 114 can transmit the provisioned information back to access point device 102 across the secure connection. In some embodiments, the provisioned information includes, but may not be limited to, identifier, key, and routing information for the private network corresponding to the private network.

In some embodiments, access point device 102 includes routing device 116 (and therefore routing device 116 can utilize such information during any subsequent routing of traffic to/from device 106 to network 122). In some embodiments, in which access point device 102 does not include routing device, routing information can be transmitted from provisioning server device 114 to routing device 116. In some embodiments, provisioning server device 114 can provide to routing device 116 and/or access point device 102 (when access point device 102 includes routing device 116 or a routing table) routing information to join device 106 to network 122.

After determination that device 106 has provided access point device 102 an identifier that is approved and the transmission of provisioning information from provisioning server device 114 to access point device 102, access point device 102 can then broadcast the name of network 122. In various embodiments, many different networks can be broadcast on a given access point device. Further, different devices associated with the same private network can access the same or different access point devices (concurrently or at non-overlapping times) to connect to the private network.

Upon detecting the broadcast signal from access point device 102, device 106 can transmit to access point device 102, a password (e.g., key) for network 122. In some embodiments, device 106 can also re-transmit the identifier for network 122.

Access point device 102 determines whether the password received from device 102 matches the password received from provisioning server device 114 for network 122 (and/or whether the passwords and identifiers match the information received from provisioning server device 114 for network 122). If there is a match of information, access point device 102 will begin hosting network 122 for device 106. In this manner, a mobile device (e.g., device 106) can gain access to a private Wi-Fi network at a location remote from the access point to which the mobile device is immediately connected without need for VPN or SSL software.

Routing device 116 can include hardware and/or software configured to transmit information between one or more devices or between two or more networks. In some embodiments, routing device 116 can be a network-based router (e.g., virtual router) that can route traffic to/from device 106 to/from network 122 (and/or one or more of devices 108, 110, 112 associated with network 122).

For example, routing device 116 can receive, from access point device 102 over network 118, information transmitted from device 106 intended for one or more of devices 108, 110, 112. Routing device 116 can store and/or access a routing table that can indicate one or more addresses for devices 106, 108, 110, 112 associated with network 112 to enable routing device 116 to forward information incoming to routing device 116 (e.g., from device 106 intended for one or more of devices 108, 110, 112 and/or from one or more of devices 108, 110, 112 intended for device 106).

Routing device 116 can be configured to allow routing device 116 to create and/or host many multiple networks, similar to the guest networks feature of current routers. For example, routing device 116 can offer a guest-type network that provides different security settings for different networks and/or different bandwidth or speed allocations for different networks.

In some embodiments, there is no gateway device for private network 122 and one or more (or, in some embodiments, each) of devices 108, 110, 112 can communicatively couple directly to network 122. In some embodiments, a residential repeater can be employed within network 122. Each of devices 106, 108, 110, 112 connected to network 122 can therefore appear to be on a local network, regardless of the access point device to which the particular device is connecting. Private network 122 can be a local area network (e.g., wireless local area network or wired local area network) in various embodiments.

If device 106 roams to network 120 from network 118, device 106 can repeat the process illustrated in FIG. 1 and previously described. However, in this case, device 106 broadcasts/transmits the identifier for network 122 to access point device 104, and access point device 104 contacts provisioning server device 114 to determine if the network 122 is an authorized network. Authentication of device 106 to network 122 and routing via routing device 116 proceeds as described with reference to the case when device 106 was located within the region covered by access point device 102. As such, users associated with a provisioned mobile device (e.g., device 106) can find it easier to roam and/or access other devices in a mobile device's private network (e.g., network 122) with greater security.

Figure 3:
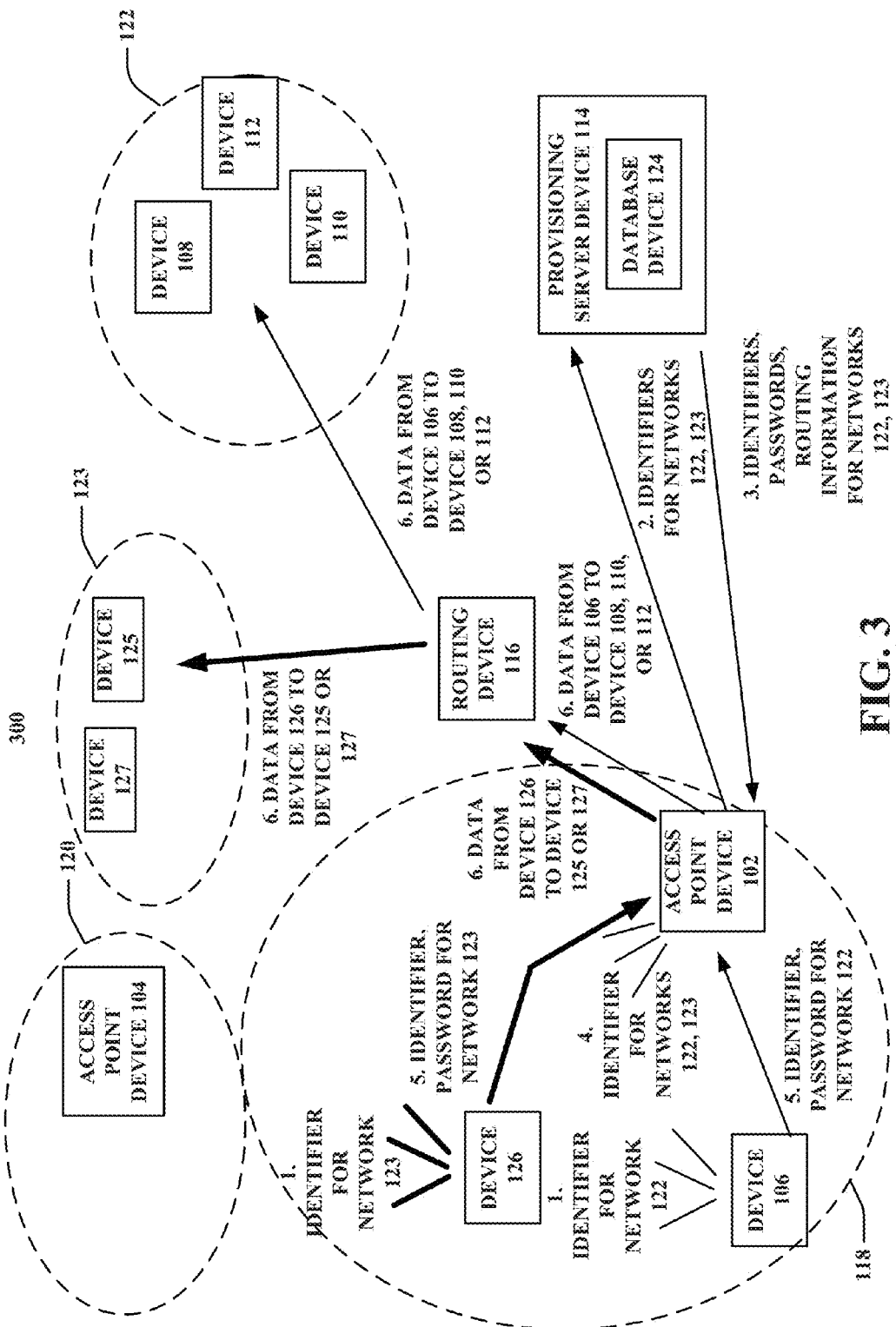
FIGS. 3 and 4 illustrate example block diagrams of other systems in which private communication networks can be facilitated in accordance with one or more embodiments.
Figure 4:
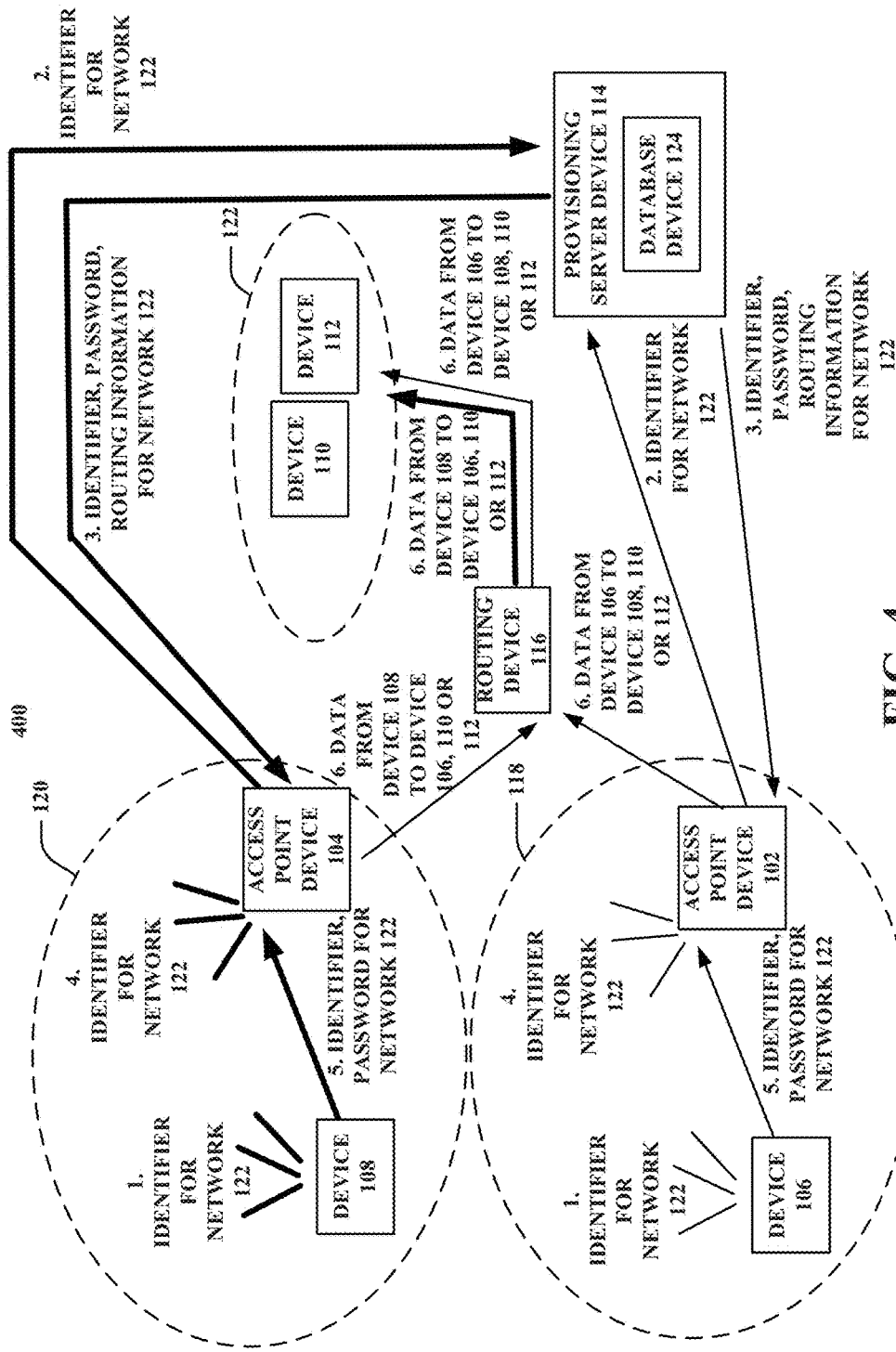

FIGS. 3 and 4 illustrate example block diagrams of other systems in which private communication networks can be facilitated in accordance with one or more embodiments. Repetitive description of like elements employed in other embodiments described herein is omitted for sake of brevity.

Turning first to FIG. 3, in some embodiments, multiple devices (e.g., devices 106, 126) can utilize the same access point device (e.g., access point device 102) to connect to the same or different networks. For example, as shown, devices 106, 126 can each be located with the area covered by network 118. Devices 106, 126 can be associated with different private networks. For example, device 106 can be associated with network 122 while device 126 can be associated with network 123. Device 106 and device 126 can each broadcast their network names, and access point device 102 can communicate with provisioning server device 114 to determine whether the networks (e.g., networks 122, 123) are authorized/approved networks.

If the networks are authorized/approved networks, access point device 102 can begin to broadcast the network names for networks 122, 123. Device 106 can respond to the broadcast of the network name for network 122 with an identifier for network 122 and a key for network 122. Device 126 can respond to the broadcast of the network name for network 123 with an identifier for network 123 and a key for network 123.

In embodiments in which the respective keys (or, in some embodiments, the respective identifier and key combinations) provided by devices 106, 126 are accurate, access point device 102 can establish a first secure link for device 106 to network 122 (and devices 108, 110, 112 communicatively coupled to network 122), and/or access point device 102 can establish a second secure link for device 126 to network 123 (and device 125, 127 communicatively coupled to network 123).

As described herein, a secure link exists between device 106 and router device 116, which is secured by a unique identifier and a unique key. In some embodiments, there can be a secure link between access point device 102 and provisioning server device 114 so that access point device 102 can verify device 106 should have access to network 122 and to obtain information to authenticate device 106 and correspondingly provide the requested service (e.g., connection of device 106 to network 122).

Another example system is shown in FIG. 4. Turning now to FIG. 4, in some embodiments, multiple devices (e.g., devices 106, 108) can utilize different access point devices (e.g., access point devices 102, 104) to connect to the same private network employing the same network name/identifier and key. The connections can be established and/or exist concurrently or during overlapping or non-overlapping time periods, for example. As shown, devices 106, 108 can be located in areas covered by respective access point devices 102, 104. Each of devices 106, 108 can be previously provisioned/assigned to private network 122 by or in connection with provisioning server device 114. Device 106 can broadcast/transmit the identifier for network 122 to access point device 102. Device 108 can broadcast/transmit the identifier for network 123 to access point device 104.

Each of access point devices 102, 104 can communicate with provisioning server device 114 to determine whether the identifier provided to the respective access point device is an authorized network. If the network (e.g., network 122) with which devices 106, 108 are authorized, access point device 102 can broadcast the name for the network (e.g., network 122), and/or access point device 104 can also broadcast the name for the network (e.g., same network—network 122).

In embodiments in which devices 106, 108 transmit to their respective access point devices (e.g., access point devices 102, 104) the correct password for the private network 122 (or, in some embodiments, the correct identifier and password combination for network 122), each of access point devices 102, 104 can establish routing to network 122 and facilitate communication between devices 106, 108 and the other devices (e.g., devices 110, 112) provisioned to network 122. Each of devices 106, 108, 110, 112 can view and/or access one another and can communicate seamlessly with one another as if each of devices 106, 108, 110, 112 is physically coupled to the same local area network or router within a coverage area (e.g., home) of network 122.

The described arrangement can reduce or eliminate many firewall and network issues. For example, a file server device represented as device 112, which is located remote from device 106 (e.g., located at a home location or in the cloud), for example, but assigned to private network 122, could appear locally attached. A common network firewall, internet protocol (IP) allocation, and other functions normally found at the DSL/Cable modem, VDSL or Fiber residential gateway can in fact be handled in a hosted virtual network router, and such a router may handle many concurrent networks. There is nothing that would potentially limit one or more of these networks from being bridged by one or more virtual network routers and in fact this feature can be desirable.

Utilizing one or more of the embodiments described herein, a private network and key can be provisioned by provisioning server device 114 and configured in device 106 during manufacturing/packaging, and then device 106 is shipped to a user that has purchased device 106. When device 106 arrives at the user, on activation, device 106 can then initiate broadcast to an access point device, authenticate and establish communication with the private network as previously described. In some embodiments, a credential, unique identifier, or other key attached to the device physically (e.g., tag) or logically (e.g., displayed on a screen) can be provided to provisioning server device 114 along with the offer to either: reconfigure device 106 to attach to a private network directly; or, in the case of some semi-private devices, such as set top boxes, digital video recorders (DVRs), etc., direct a network virtual routers to bridge a private network that may be associated with the semi-private devices to the private network associated with device 106. Multiple bridges can be established in the network for multiple devices. In either embodiment, the configuration of the devices or the networks can be reflexive in the network routers or provisioning server device 114, and not require direct intervention by a user of device 106 (but, in some cases, require or employ only explicit or implicit authorization by the user).

By providing security at the private network (e.g., between private network 122 and routing device 116 or between device 106 and private network 122) and the internal network level (e.g., between access point device 102 and provisioning server device 114), in multiple layers, routing device 116 can effectively manage private network 122 to identity potential issues.

Some features that can be enabled include device identification and/or access point history and mapping. Bandwidth management can also be performed since knowledge of the location of a particular device can be stored and analyzed over time. Another feature can be providing device security. If the device is re-located without authorization, the device can be locatable by the access point device that the re-located device broadcasts/transmits a signal to upon attempting to access the private network associated with the device. This can also prevent or reduce the likelihood that certain end user devices will be sold or re-provisioned without authorization from an authorized company or seller of the device.

Another feature that can be provided can be the provisioning of a common firewall for the private network, and isolating the private network. In some embodiments, devices within the private network can be isolated from other devices in the private network if the devices are compromised.

Another that can be provided can be control at the media access control (MAC) to allow or block communication from a device if needed. Another feature that can be provided can be device-to-device access rules. Another feature that can be provided is personal network to private network mapping, which can allow isolation and protection of traffic from/to semi-private devices (e.g., set top boxes and the DVR Video IP traffic) to each other and the VDO from the end user's network, while continuing to allow access to the devices for IP based application programming interfaces (APIs) (e.g., remotes, third screen applications).

Micro-segmented networking can be employed to facilitate one or more of these embodiments. As an example, the DVR can have three micro-segments. One micro-segment can be a public segment for commercially broadcast internet protocol (IP) traffic; one micro-segment can be a second private segment for DVR-to-DVR or user device-to-user device communications; and one micro-segment can be a third private network for appliance or applications interface. In embodiments in which the network boundary is made granular enough, the mapping of routes to/from any network and the security of that data can be the same. In some embodiments, the major difference is the visibility of that network.

One or more (or, in some embodiments, each) newly provisioned device in the embodiments described, once connected to an access point device, can be considered to have a VLAN of one device and a virtual network gateway to the Internet. As described in the above example, additional devices providing service to a home can be joined at either the gateways, or can be re-provisioned to share a common VLAN. An example could be a DVR and additional set top boxes. The end user device does not need to have visibility in the communications directly between the DVR and additional set top boxes, and the VDO, which can supply content to the DVR and additional set top boxes, can be accessed via the virtual gateway for their subnets in the network. However, IP-based content and control devices (e.g., tablets, phones, etc.) that would interact with the DVR and/or additional set top boxes need network connectivity to the DVR and/or additional set top boxes. As such, a gateway-to-gateway relationship can be established so that API calls between a user's IP data network devices (e.g., the above-mentioned tablets, phones, etc.) and the DVR and additional set top boxes can take place while keeping the rest of the network traffic in these virtual networks separated.

Turning back to FIGS. 1, 2 and 3, in one or more of the embodiments, access point device 102 need not be a significant distance from access point device 104. In some embodiments, for example, if there is a residential area where multiple access points are provided on homes, pedestals, mailboxes at homes, one side of a home can receive service from access point 102 while another side of the home can receive service from access point 104. In these embodiments, access point devices 102, 104 can communication information between one another. As such, in some embodiments, device 106 need not re-authenticate when roaming from access point device 102 to access point device 104. From the vantage point of device 106, each of devices 106, 108, 110, 112 is communicatively coupled to a single network. As such, devices 106, 108, 110, 112 can communicate with one another with freedom over the private network. However, when any of devices 106, 108, 110, 112 communicate with any other device outside of the private network, routing device 116 can protect the private network from the rest of the Internet. Any one of devices 106, 108, 110, 112 can access the private network. VPN tokens and SSL software are unnecessary in the embodiments described herein.

Figure 5:
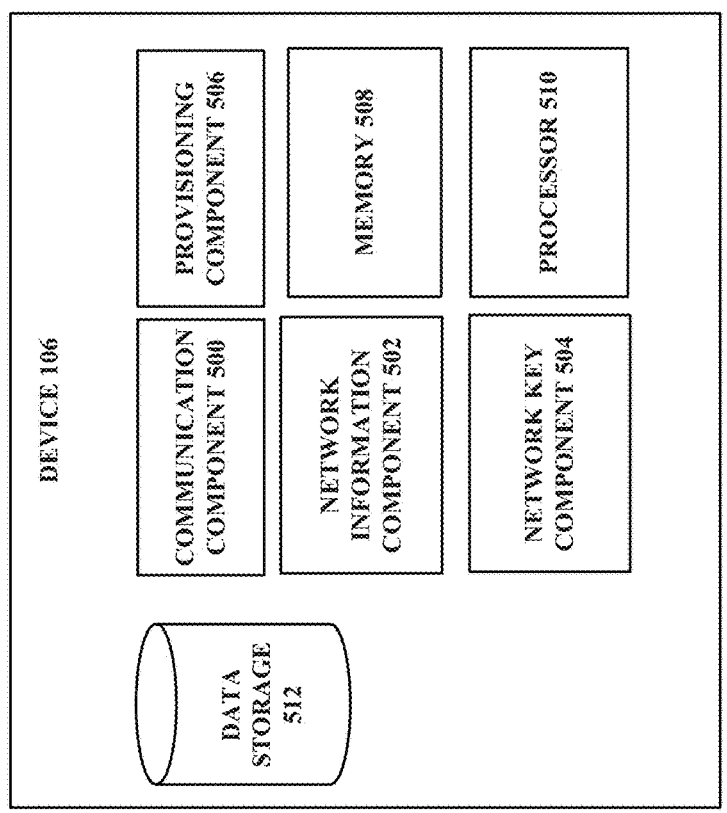
FIG. 5 illustrates an example block diagram of a device of the systems of FIG. 1, 3 or 4 in accordance with one or more embodiments described herein.

FIG. 5 illustrates an example block diagram of a device of the systems of FIG. 1, 3 or 4 in accordance with one or more embodiments described herein. Repetitive description of like elements employed in other embodiments described herein is omitted for sake of brevity.

In the embodiment shown, device 106 includes communication component 500, network information component 502, network key component 504, provisioning component 506, memory 508, processor 510 and/or data storage 512. In various embodiments, one or more of communication component 500, network information component 502, network key component 504, provisioning component 506, memory 508, processor 510 and/or data storage 512 can be electrically and/or communicatively coupled to one another to perform one or more functions of device 106.

Communication component 500 can include hardware, software and/or a combination of hardware and software configured to transmit and/or receive information to/from one or more of devices 108, 110, 112 and/or access point devices 102, 104. For example, in various embodiments, communication component 700 can transmit/broadcast an identifier and/or key indicative of a private network to which device 106 is associated. As another example, communication component 500 can receive a broadcast/transmitted signal from access point device 102 including the name of private network 122.

Network information component 502 can process information indicative of the identifier for network 122 while network key component 504 can process information indicative of the password/key for network 122.

Provisioning component 506 can include hardware and/or software provisioned in device 106 for performing one or more functions described herein. For example, provisioning component 506 can be updated and/or adjusted upon provisioning of device 106 to enable device 106 to access private network 122. Provisioning component 506 can also include hardware and/or software that configures device 106 to perform one or more different functions according to the nature of the device (e.g., set top box operations, smart phone operations, digital video recorder operations).

Memory 508 can store computer-executable instructions that can be executed by processor 510. For example, memory 508 can store instructions for authenticating device 106 to private network 122 and/or communicating with one or more devices assigned to private network 122. Processor 706 can process computer-readable storage medium computer-executable instructions to perform one or more of the functions described herein with reference to device 106. Data storage 512 can store information indicative of identifier, key or other information for facilitating the operations of device 106.

Figure 6:
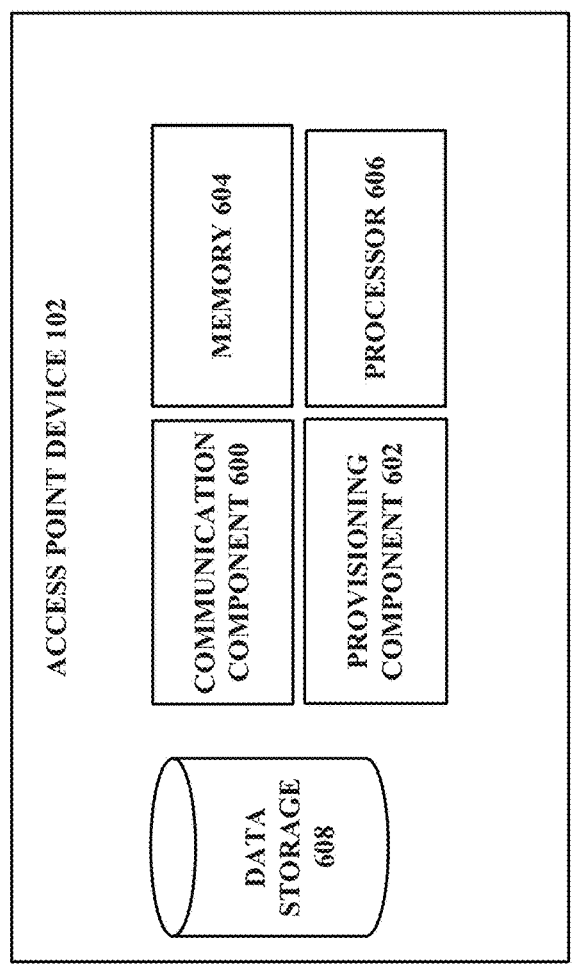
FIG. 6 illustrates an example block diagram of an access point device of the systems of FIG. 1, 3 or 4 in accordance with one or more embodiments.

FIG. 6 illustrates an example block diagram of an access point device of the systems of FIG. 1, 3 or 4 in accordance with one or more embodiments. Repetitive description of like elements employed in other embodiments described herein is omitted for sake of brevity.

In the embodiment shown, access point device 102 includes communication component 600, provisioning component 602, memory 604, processor 606 and/or data storage 608. In various embodiments, one or more of communication component 600, provisioning component 602, memory 604, processor 606 and/or data storage 608 can be electrically and/or communicatively coupled to one another to perform one or more functions of access point device 102.

Communication component 600 can include hardware, software and/or a combination of hardware and software configured to transmit and/or receive information to/from access point device. For example, in various embodiments, communication component 600 can receive a signal including information indicative of an identifier private network, a key for the private network or the like. Communication component 600 can broadcast the name of the private network and/or query provisioning server device 114 to determine if the received identifier is for an approved/authorized private network.

Provisioning component 602 can process provisioning information received from provisioning server device 114, establish routing when routing device 116 is within or associated with access point device 102 or the like. Memory 604 can store computer-executable instructions that can be executed by processor 606. For example, memory 704 can store instructions for determining whether an identifier represents an authorized network, bandwidth and/or speed to provision for a network and the like. Processor 606 can process computer-readable storage medium computer-executable instructions to perform one or more of the functions described herein with reference to access point device 102. Data storage 608 can store information indicative of a private network and corresponding device communicatively coupled to access point device 102.

Figure 7:
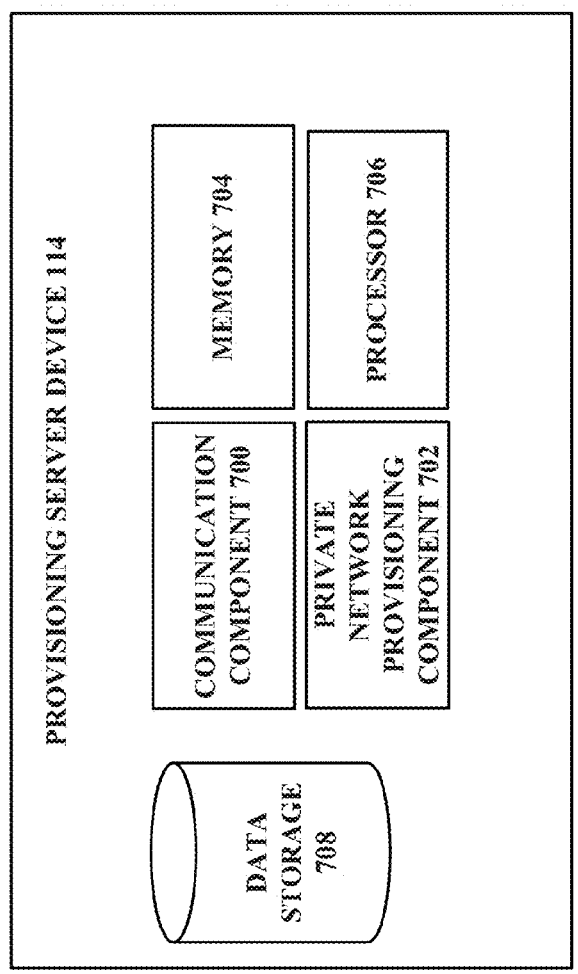
FIG. 7 illustrates an example block diagram of a provisioning server device of the systems of FIG. 1, 3 or 4 in accordance with one or more embodiments described herein.

FIG. 7 illustrates an example block diagram of a provisioning server device of the systems of FIG. 1, 3 or 4 in accordance with one or more embodiments described herein. Repetitive description of like elements employed in other embodiments described herein is omitted for sake of brevity.

In the embodiment shown, provisioning server device 114 includes communication component 700, private network provisioning component 702, memory 704, processor 706 and/or data storage 708. In various embodiments, one or more of provisioning server device 114 includes communication component 700, private network provisioning component 702, memory 704, processor 706 and/or data storage 708 can be electrically and/or communicatively coupled to one another to perform one or more functions of provisioning server device 114.

Communication component 700 can include hardware, software and/or a combination of hardware and software configured to transmit and/or receive information from provisioning server device 114. For example, in various embodiments, communication component 700 can receive information indicative of an identifier broadcast/transmitted to an access point device and transmit, to access point device 102, information indicative of the identifier, key and/or bandwidth or speed provisioning information if the identifier is determined to be an authorized network by private network provisioning component 702.

Private network provisioning component 702 can determine whether an identifier represents an authorized network, transmit information for allowing access point device to authenticate the device and/or provide communication service for the network from the access point device to the private network of the device, make decisions for and provision bandwidth and/or speed for the network (or, in some embodiments, for different devices within the network) or any number of actions as described herein.

Memory 704 can store computer-executable instructions that can be executed by processor 706. For example, memory 704 can store instructions for determining whether an identifier represents an authorized network, bandwidth and/or speed to provision for a network and the like. Processor 706 can process computer-readable storage medium computer-executable instructions to perform one or more of the functions described herein with reference to provisioning server device 114.

Data storage 708 can store information indicative of provisioning table 800 shown with reference to FIG. 8 described herein, database device information or the like.

FIG. 8 illustrates an example provisioning table of the provisioning server device of FIG. 7 in accordance with one or more embodiments described herein. Repetitive description of like elements employed in other embodiments described herein is omitted for sake of brevity.

In various embodiments, provisioning table 800 can be stored at or accessible over a network by database device 124 of provisioning server device 114. As shown, provisioning table 800 can include network name/identifier information, which includes one or more identifiers for one or more respective private networks provisioned by provisioning server device 114, password/key information corresponding to a private network and employed to allow access by a device to the private network and/or provisioned devices for a particular private network (e.g., devices 106, 108, 110, 112 are provisioned for network 122 while devices 125, 126, 127 are provisioned for network 123). In some embodiments, provisioning table 800 can also include information indicating whether the network is currently authorized (e.g., whether service is discontinued, for example, if a user is vacationing out of the country for three months and would like to have the service discontinued during that time, or for any other reason, failure of payment for service, etc.). In some embodiments in which provisioning server device 114 also provisions bandwidth and/or speed for a network, the provisioned respective bandwidth and/or speed for the network can also be included in provisioning table 800. Routing information can also be provided for each network.

In one embodiment, the identifier, password/key and routing information for a network can be provided by provisioning server device 114 to an access point device requesting confirmation of whether a network name/identifier broadcast to access point device is within an approved set of networks managed by provisioning server device 114.

FIGS. 9-12 illustrate example flow diagrams for facilitating private communication networks in accordance with one or more embodiments. Repetitive description of like elements employed in other embodiments described herein is omitted for sake of brevity.

Figure 9:
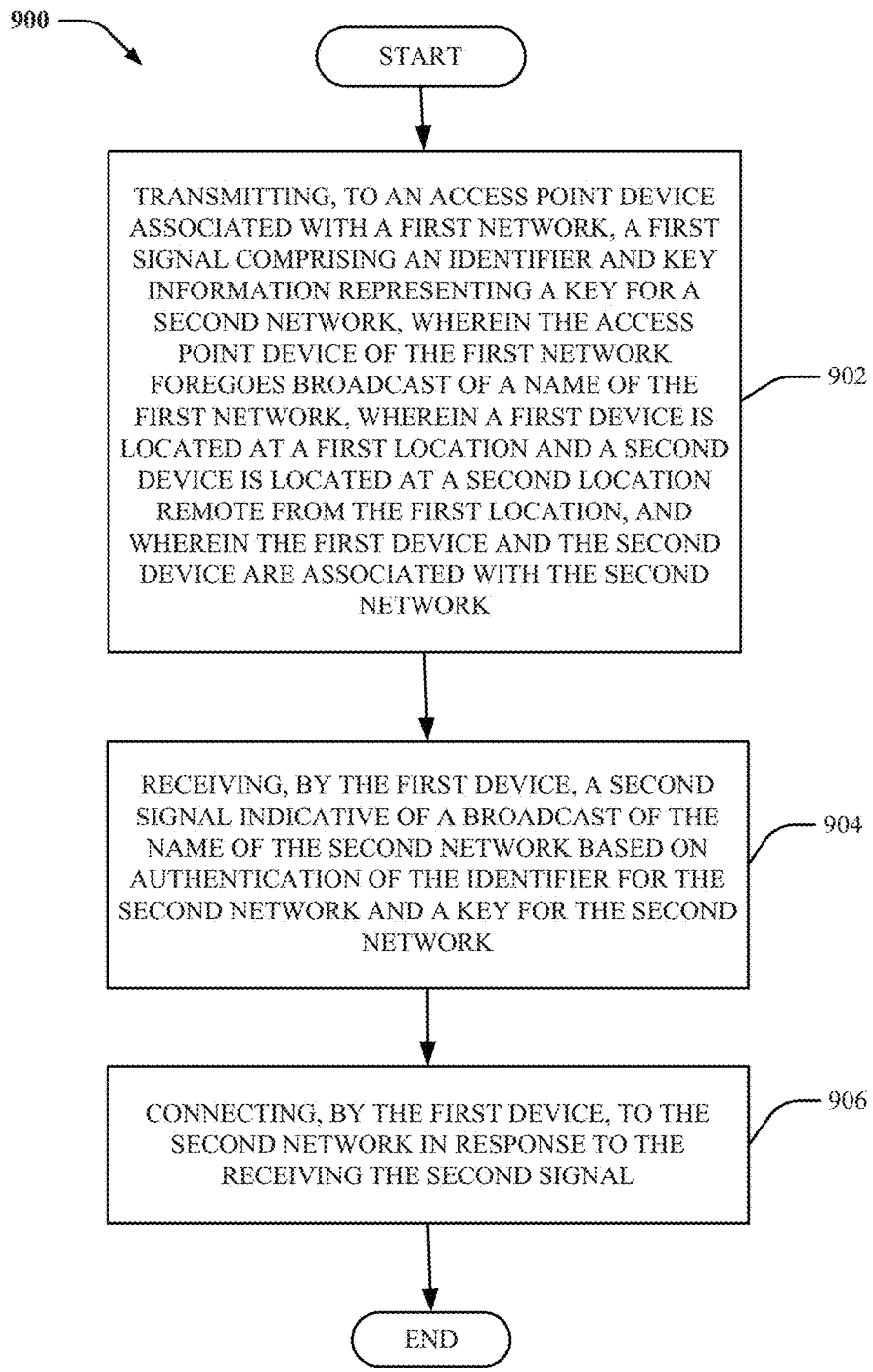
FIGS. 9-12 illustrate example flow diagrams for facilitating private communication networks in accordance with one or more embodiments.

Turning first to FIG. 9, at 902, method 900 can include transmitting, to an access point device associated with a first network, a first signal including an identifier and key information representing a key for a second network, wherein the access point device of the first network foregoes broadcast of a name of the first network, wherein a first device is located at a first location and a second device is located at a second location remote from the first location, and wherein the first device and the second device are associated with the second network.

In some embodiments, although not shown, method 900 can also include communicating, by the first device, via the access point device and the second network, with the second device. The second device can be or include a second device located at the residential address.

In some embodiments, although not shown, a secure link can be established between the first device and the access point device. A secure link can also be established between the access point device and the provisioning server.

At 904, method 900 can include receiving, by the first device, a second signal indicative of a broadcast of the name of the second network based on an authentication of the identifier for the second network and key data representing a key for the second network. In some embodiments, the authentication of the identifier for the second network and the key for the second network can be facilitated in response to information identifying a name of the second network being located by a provisioning device communicatively coupled to the access point device.

At 906, method 900 can include connecting, by the first device, to a network device of the second network in response to the receiving the second signal. In some embodiments, connecting to the second network includes connecting to the second network via a wireless router device communicatively coupled to the first device and the second device.

Figure 10:
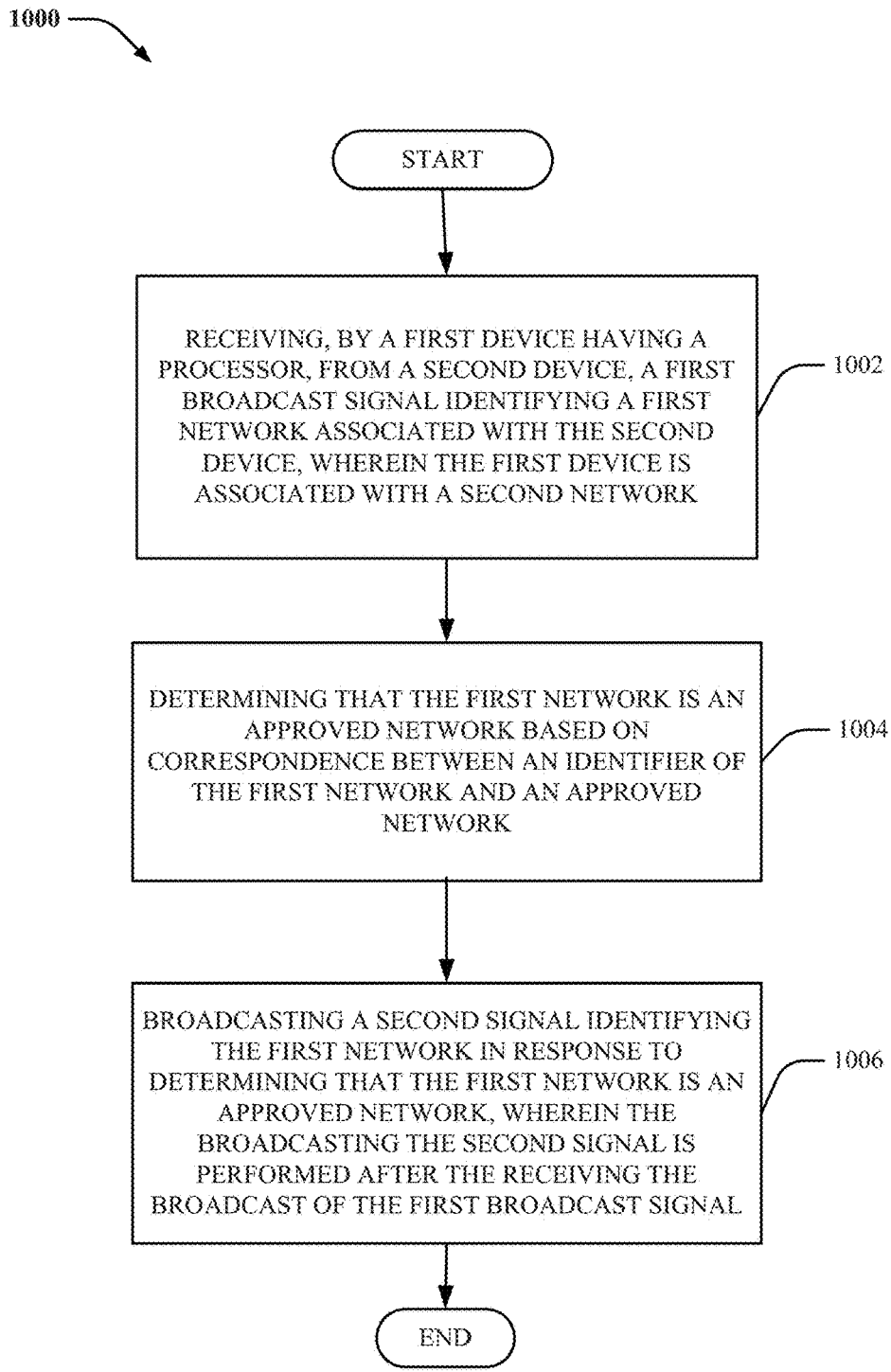

Turning now to FIG. 10, at 1002, method 1000 can include receiving, from a second device, a first broadcast signal identifying a first network associated with the second device, wherein the first device is associated with a second network.

In some embodiments, although not shown, the method can also include receiving a third signal from a provisioning server device that stores approved network information, wherein the third signal comprises information indicating that the first network is an approved network. The first device can be an access point device while the second device can be a mobile device.

At 1004, method 1000 can include determining that the first network is approved based on correspondence between an identifier of the first network and information about approved networks. At 1006, method 1000 can include broadcasting a second signal identifying the first network in response to determining that the first network is approved, wherein the broadcasting the second signal is performed after the receiving the broadcast of the first broadcast signal In some embodiments, although not shown, authenticating the second device to the first network can be based on receiving a key from the second device that corresponds to the first network. The method can also include transmitting data from the second device to a third device communicatively coupled to the first network and located at a first location remote from a second location of the second device.

Figure 11:
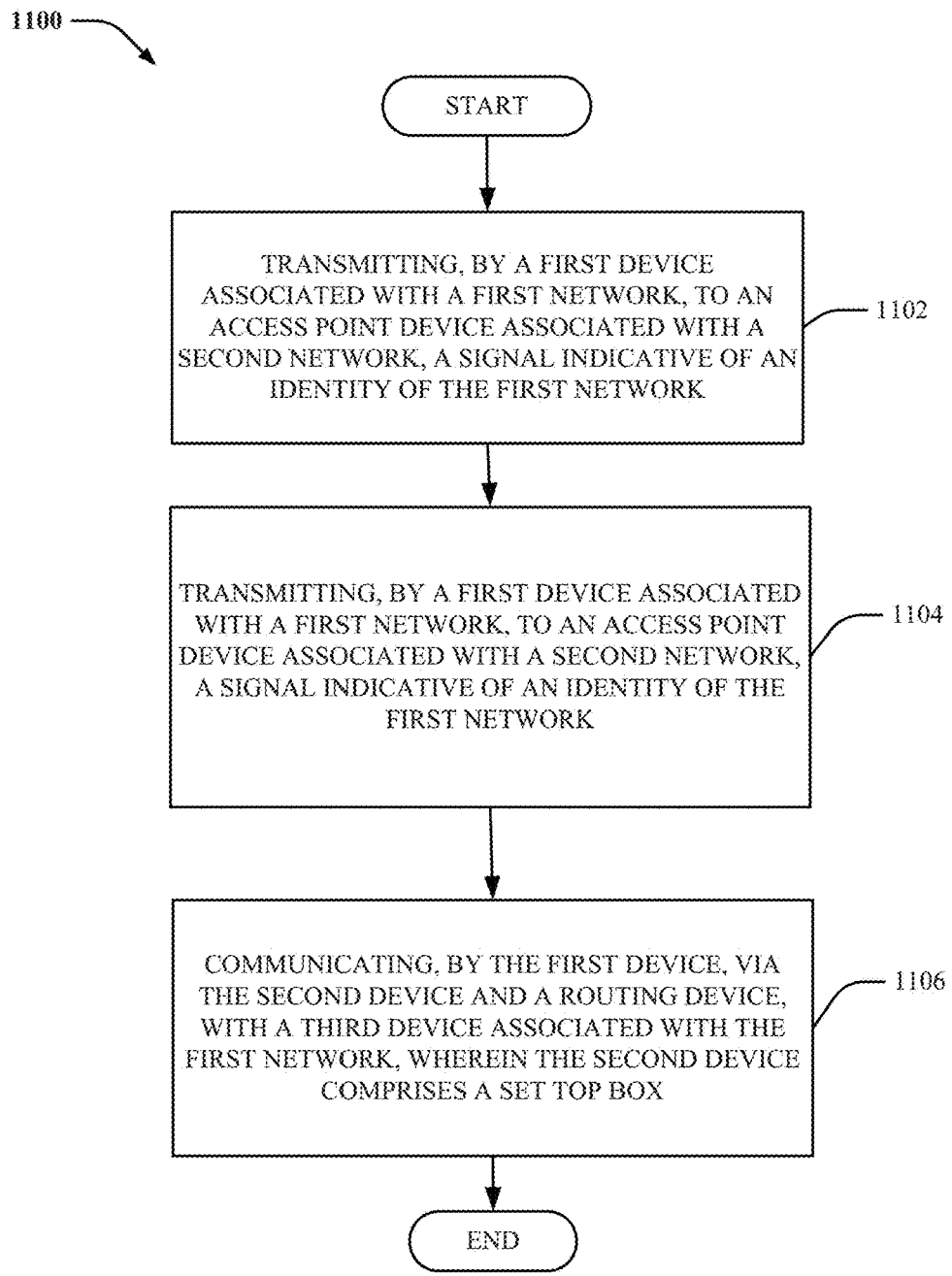

Turning now to FIG. 11, at 1102, method 1100 can include transmitting, by a first device associated with a first network, to an access point device associated with a second network, a signal indicative of an identity of the first network. At 1104, method 1100 can include transmitting, by a first device associated with a first network, to an access point device associated with a second network, a signal indicative of an identity of the first network. At 1106, method 1100 can include communicating, by the first device, via the second device and a routing device, with a third device associated with the first network, wherein the second device comprises a set top box.

Figure 12:
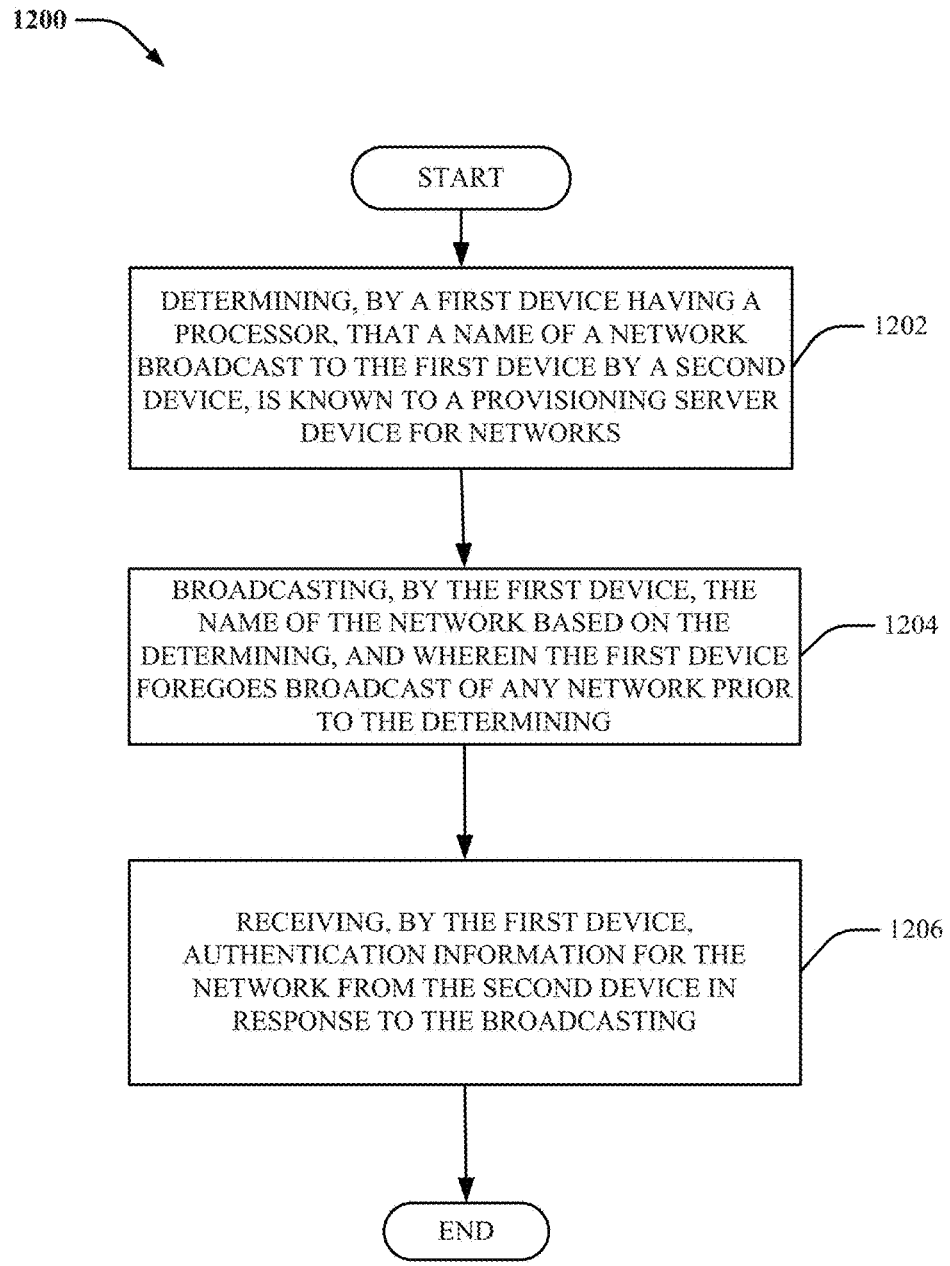

Turning now to FIG. 12, at 1202, method 1200 can include determining, by a first device having a processor, that a name of a network broadcast to the first device by a second device, is known to a provisioning server device for networks. At 1204, method 1200 can include broadcasting, by the first device, the name of the network based on the determining, and wherein the first device foregoes broadcast of any network prior to the determining. At 1206, method 1200 can include receiving, by the first device, authentication information for the network from the second device in response to the broadcasting.

Figure 13:
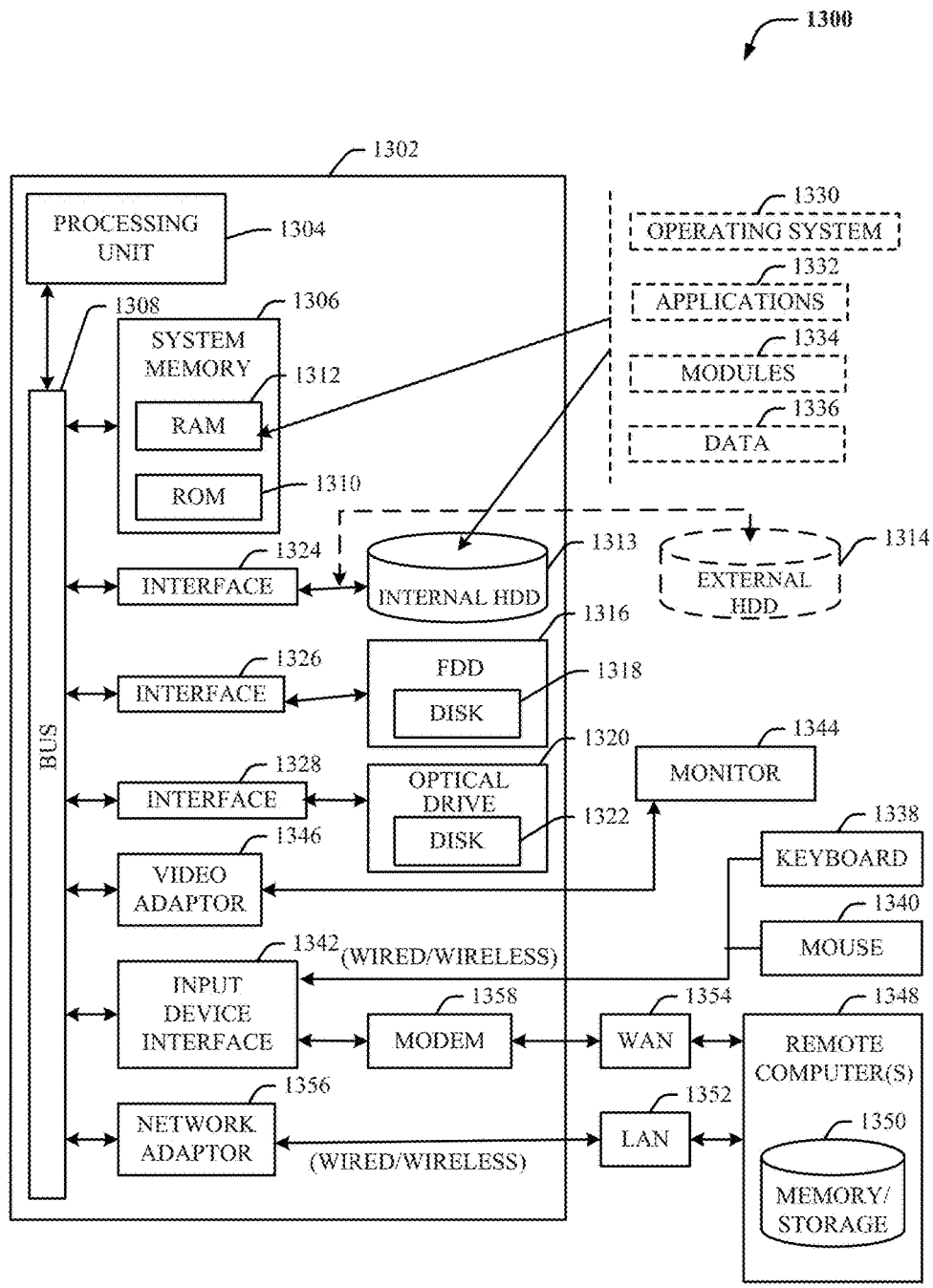
FIG. 13 illustrates a block diagram of a computer operable to facilitate private communication networks in accordance with one or more embodiments in accordance with one or more embodiments.

FIG. 13 illustrates a block diagram of a computer operable to facilitate private communication networks in accordance with one or more embodiments in accordance with one or more embodiments. Repetitive description of like elements employed in other embodiments described herein is omitted for sake of brevity.

In some embodiments, the computer can be or be included within any number of components described herein including, but not limited to, devices 106, 108, 110, 112, 125, 126, 127 (or any components thereof), access point devices 102, 104 (or any components thereof), provisioning server device 114 (or any components thereof) and/or routing device 116 (or any components thereof).

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the embodiments described herein includes a computer 1302, the computer 1302 including a processing unit 1304, a system memory 1306 and a system bus 1308. The system bus 1308 couples system components including, but not limited to, the system memory 1306 and the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1310 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A mobile device can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless AP disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments is intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   authenticating, by a device comprising a processor, to an access point device, a right to use a network device of a second network,
      wherein the authenticating is performed prior to detection of a broadcast signal from the access point device, the broadcast signal being broadcast from the access point device only after the authenticating by the device,
      wherein the access point device is associated with a first network,
      wherein the second network is a residential home network associated with the device,
      wherein the first network is a hidden network of the access point device,
      wherein the access point device is accessible by the device based on the device having a defined subscription to use the access point device,
      wherein the authenticating comprises transmitting, by the device, a first signal comprising an identifier for the second network,
      wherein the device is located at a first location and the network device is located at a second location remote from the first location, and
      wherein the device and the network device are associated with the second network;
   receiving, by the device, from the access point device, a second signal indicative of a broadcast of a name of the second network based on an authentication of the identifier for the second network and key data representing a key for the second network; and
   connecting, by the device, to the network device of the second network in response to the receiving the second signal to facilitate communication between the device and the network device.

2. The method of claim 1, further comprising:
   communicating, by the device via the access point device, with the network device.

3. The method of claim 2, wherein the second location is located at a residential address associated with the device and the network device.

4. The method of claim 3, wherein the network device is located at the residential address.

5. The method of claim 1, wherein the connecting to the network device of the network comprises connecting to the network device of the network via a wireless router device communicatively coupled to the device and the network device.

6. The method of claim 1, wherein a first link between the device and the access point device is a first encrypted link and a second link between the access point device and a provisioning server device is a second encrypted link different than the first encrypted link, and wherein the provisioning server device is configured to establish a connection between the device and the first network.

7. The method of claim 1, wherein the name is a first name, and wherein the authentication of the identifier for the second network and the key data for the second network is facilitated in response to information identifying a second name of the second network being located by a provisioning device communicatively coupled to the access point device.

8. An apparatus, comprising:
   a processor; and
   a memory that stores executable instructions that, when executed by the processor, facilitate performance of operations, comprising:
      transmitting, to an access point device associated with a first network, wherein the first network is a hidden network, a first signal comprising an identifier and key information representing a key for a second network, wherein the second network is a residential home network, wherein the access point device of the first network forgoes broadcast until after authentication of the second network, wherein a first device is located at a first location and a second device is located at a second location remote from the first location, and wherein the first device and the second device are associated with the second network;
      receiving a second signal indicative of a broadcast of a name of the second network based on the authentication, wherein the authentication comprises the authentication of the identifier and the key information having been performed by a provisioning server device communicatively coupled to the access point device; and connecting to a network device of the second network in response to the receiving the second signal.

9. The apparatus of claim 8, wherein the operations further comprise:
communicating via the access point device and the network device of the second network, with the second device, and wherein the hidden network is a network that forgoes the broadcast of a name of the network until after the authentication of the second network.

10. The apparatus of claim 9, wherein the second location is located at a residential address associated with the first device and the second device.

11. The apparatus of claim 10, wherein the second device comprises a device located at the residential address.

12. The apparatus of claim 8, wherein the connecting to the network device of the network comprises connecting to the network device of the second network via a wireless router device communicatively coupled to the first device and the second device.

13. The apparatus of claim 8, wherein a first link between the first device and the access point device is a first encrypted link and a second link between the access point device and the provisioning server device is a second encrypted link different than the first encrypted link.

14. The apparatus of claim 8, wherein the name is a first name, and wherein the authentication of the identifier for the second network and the key information for the second network is facilitated in response to information identifying a second name of the network being located by a provisioning server device communicatively coupled to the access point device.

15. A machine-readable storage medium, comprising executable instructions that, when executed by a processor of an access point device, facilitate performance of operations, comprising:
receiving, from a first device, a first broadcast signal identifying, via a service set identifier, a first network associated with a second device, wherein the first network associated with the second device is a home network, wherein the first device is associated with a second network, and wherein the second network comprises a hidden network;
determining that the first network is approved based on correspondence between an identifier of the first network and information about approved networks, wherein the information about the approved networks indicates service for the first network is not temporarily discontinued; and
broadcasting a second signal to the first device, in response to determining that the first network is approved, and not prior to the determining that the first network is approved, wherein the second signal identifies the first network.

16. The machine-readable storage medium of claim 15, wherein the operations further comprise:
receiving a third signal from a provisioning server device that stores the information about approved networks, and wherein the information about the approved networks further comprises bandwidth information representative of a bandwidth of the first network.

17. The machine-readable storage medium of claim 16, wherein the operations further comprise:
authenticating the first device to the first network based on receiving a key from the first device that corresponds to the first network.

18. The machine-readable storage medium of claim 17, further comprising:
transmitting data from the first device to a third device communicatively coupled to the first network and located at a first location remote from a second location of the first device.

19. The machine-readable storage medium of claim 18, wherein the first device is a mobile device and the second device is an access point device.

20. The machine-readable storage medium of claim 15, wherein an encrypted link is provided between the second device and a provisioning server device, and wherein the provisioning server device is configured to establish a connection between the first device and the first network.

* * * * *